US007925686B2

(12) United States Patent
Abbasfar et al.

(10) Patent No.: US 7,925,686 B2
(45) Date of Patent: Apr. 12, 2011

(54) LINEAR TRANSFORMATION CIRCUIT

(75) Inventors: Aliazam Abbasfar, Cupertino, CA (US); Amir Amirkhany, Stanford, CA (US); Vladimir Stojanovic, Lexington, MA (US); Mark A. Horowitz, Menlo Park, CA (US)

(73) Assignee: Rambus Inc., Sunnyvale, CA (US)

( * ) Notice: Subject to any disclaimer, the term of this patent is extended or adjusted under 35 U.S.C. 154(b) by 1513 days.

(21) Appl. No.: 11/311,971

(22) Filed: Dec. 19, 2005

(65) Prior Publication Data

US 2007/0143387 A1 Jun. 21, 2007

(51) Int. Cl.
*G06F 17/14* (2006.01)
*G06F 17/15* (2006.01)

(52) U.S. Cl. ........................................ 708/400; 708/5

(58) Field of Classification Search .............. 708/5, 402, 708/404, 405
See application file for complete search history.

(56) References Cited

U.S. PATENT DOCUMENTS

| | | | | | |
|---|---|---|---|---|---|
| 3,987,292 | A * | 10/1976 | Means | 708/4 |
| 4,041,284 | A * | 8/1977 | Bond | 708/5 |
| 4,583,188 | A * | 4/1986 | Cann et al. | 708/9 |
| 4,689,762 | A | 8/1987 | Thibodeau, Jr. | |
| 5,371,696 | A | 12/1994 | Sundararajan et al. | |
| 6,061,705 | A | 5/2000 | Hellberg | |
| 6,098,088 | A | 8/2000 | He et al. | |
| 6,366,936 | B1 | 4/2002 | Lee et al. | |
| 2004/0015530 | A1 | 1/2004 | Kang | |
| 2004/0042387 | A1 | 3/2004 | Geile | |

FOREIGN PATENT DOCUMENTS

| | | |
|---|---|---|
| JP | 10 107758 | 4/1998 |
| JP | 2000 138648 | 5/2000 |
| WO | WO 0002140 | 1/2000 |
| WO | WO 02/17615 | 2/2002 |

OTHER PUBLICATIONS

Bogucka, H., "Application of the New Joint Complex Hadamard-Inverse Fourier Transform in a OFDM/CDMA Wireless Communication System," 50th Vehicular Technology Conference, (VTC '99), Sep. 1999, pp. 2929-2933.

Giannakis, G. et al., "Generalized Multicarrier CDMA: Unification and Linear Equalization," EURASIP Journal on Applied Signal Processing, vol. 2005, No. 1, pp. 743-756.

Han, S.H. et al., "An Overview of Peak-To-Average Power Ratio Reduction Techniques for Multicarrier Transmission," IEEE Wireless Communications, vol. 12, No. 2, Apr. 2005, pp. 56-65.

Silverman, H., "An Introduction to Programming the Winograd Fourier Transform Algorithm (WFTA), IEEE Transactions on Acoustics, Speech, and Signal Processing," vol. 25, No. 2, Apr. 1977, pp. 152-165.

Yang, Z., "Design of a 3780-Point IFFT Processor for TDS-OFDM," IEEE Transactions on Broadcasting, vol. 48, No. 1, Mar. 2002, pp. 57-61.

International Search Report and Written Opinion for international application No. PCT/US2006/061655, mailed Apr. 7, 2008.

* cited by examiner

*Primary Examiner* — Chuong D Ngo

(74) *Attorney, Agent, or Firm* — Morgan, Lewis & Bockius LLP

(57) ABSTRACT

A first device is described. The first device may include a linear transformation circuit to implement multiplication by a matrix D. The linear transformation circuit may have an input to receive a vector having N digital values and an output to output N first output signals, a sign-adjustment circuit to adjust signs of a subset including at least M of the N first output signals in accordance with a set of coefficients H, and a conversion (DAC) circuit coupled to the sign-adjustment circuit. Outputs from the DAC circuit may be summed to produce an output.

21 Claims, 9 Drawing Sheets

LINEAR TRANSFORMATION CIRCUIT

FIELD OF THE INVENTION

The present invention relates generally to circuits for implementing a linear transformation and devices containing such circuits.

BACKGROUND

Many systems have circuit implementations of a linear transformation, such as discrete Fourier transform (DFT) and/or an inverse discrete Fourier transform (IDFT). For example, communications systems that utilize multi-tone links often implement the IDFT during transmission of data and the DFT during receiving of the data. These transformations are useful in getting close to capacity from the communication channel.

The DFT and/or the IDFT are often implemented using digital circuits. This is illustrated by circuits 100 and 150 shown in FIGS. 1A and 1B, respectively. The circuits 100 and 150 may be included in transmitters and receivers in communication systems. In FIG. 1A, the circuit 100 may include an IDFT, which transforms an input vector X 110 into intermediate output Y=FX 114, and parallel-to-serial (P/S) converter 116, which converts the intermediate output Y=FX 114 into a serial data stream. Typically, these operations are implemented in a digital domain 122. A digital-to-analog converter (DAC) 118 converts digital signals to an analog domain 124 yielding an output V 120. The IDFT 112 and the DAC 118 each may be clocked at a rate that is at least at the Nyquist rate (two times the symbol rate) using a clock 126.

In FIG. 1B, the circuit 150 may receive input signal 152. The input signal 152 may be the output V 120. The input signal 152 is converted from the analog domain 124 to the digital domain 122 by analog-to-digital converter (ADC) 154. The circuit 150 may include serial-to-parallel (S/P) converter 156 and a DFT 158 to convert the digital signals to a vector V 162. The ADC 154 and the DFT 158 each may be clocked at least at the Nyquist rate using a clock 160. At high data rates, however, circuits, such as the circuit 100 (FIG. 1A) and the circuit 150, may have excessive sampling rates, i.e., high frequencies for the clocks 126 (FIG. 1A) and 160, and resolution or quantization requirements. As a consequence, digital implementations of transformations such as the IDFT 112 and the DFT 158, may be complex, costly and may consume significant amounts of power. There is a need, therefore, for improved linear transformation circuits.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1A:
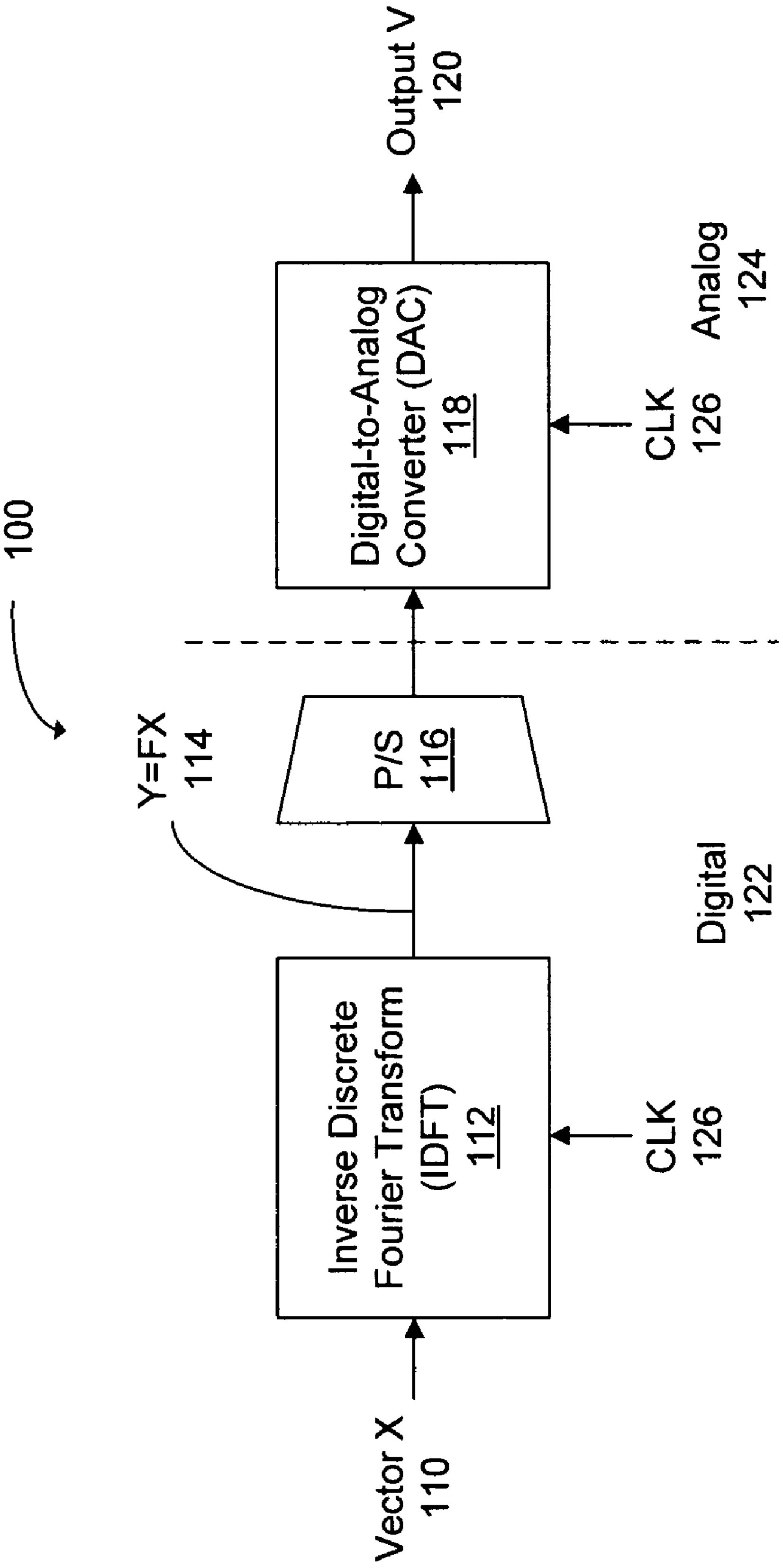
Figure 1A (Prior Art)
FIG. 1A is a block diagram illustrating an embodiment of circuit that implements an inverse discrete Fourier transform (IDFT).
Figure 1B:
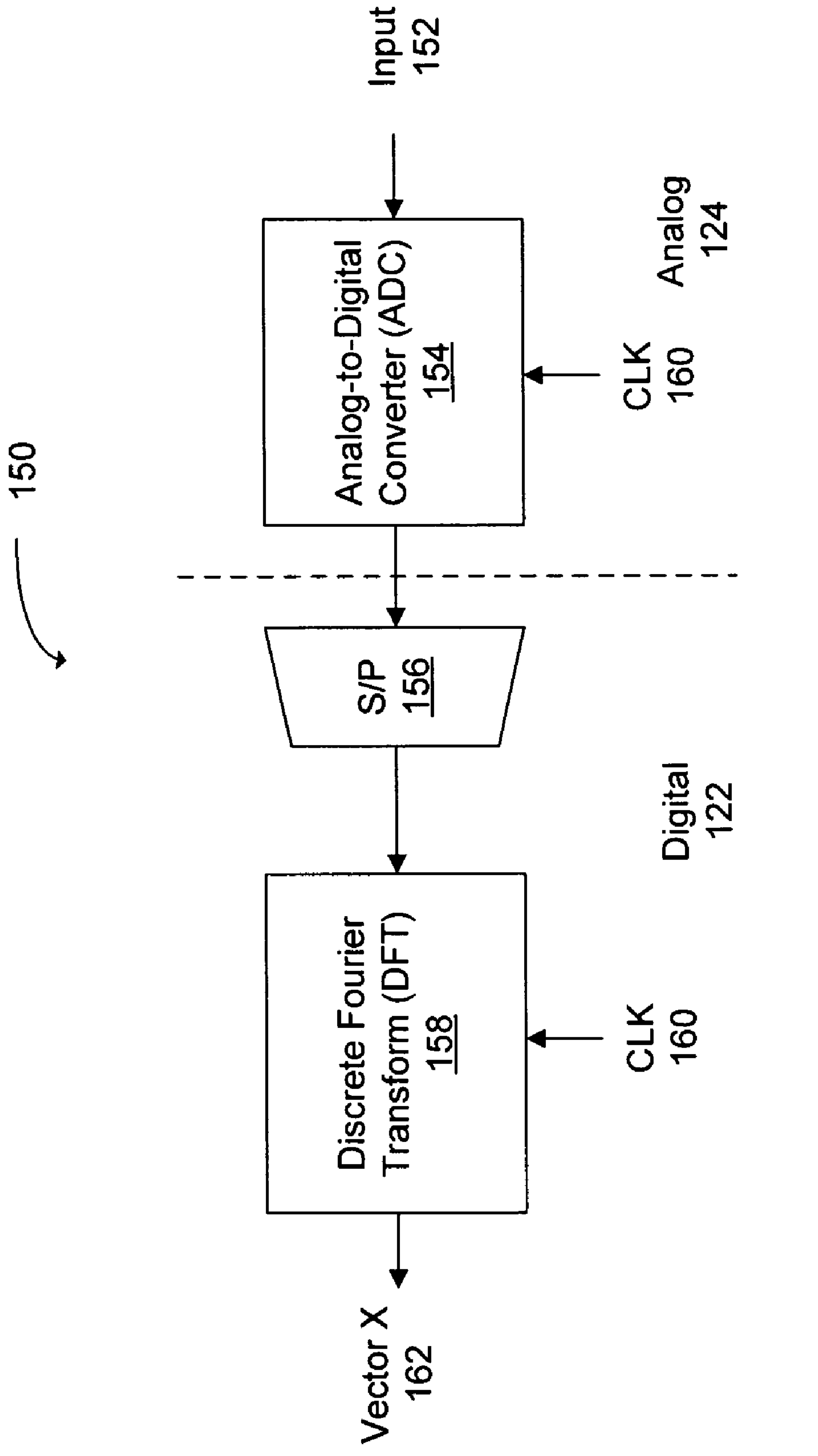
Figure 1B (Prior Art)
FIG. 1B is a block diagram illustrating an embodiment of circuit that implements a discrete Fourier transform (DFT) circuit.

A first device is described. The first device may include a first linear transformation circuit to implement multiplication by a first matrix D. The first linear transformation circuit may have a first input to receive a vector having N digital values and a first output to output N first output signals, a first sign-adjustment circuit to adjust signs of a subset including at least M of the N first output signals in accordance with a first set of coefficients H, and a first digital-to-analog conversion (DAC) circuit coupled to the sign-adjustment circuit. Outputs from the first DAC circuit may be summed to produce a second output.

The first matrix D and the first set of coefficients H may correspond to a decomposition of an inverse discrete Fourier transform (IDFT). The second output may correspond to the IDFT of the vector.

The first device may include a first output-selection circuit to select the subset of the N first output signals in accordance with the first set of coefficients H. The first set of coefficients H may include 0, 1 and −1.

N analog output values in the second output may be generated sequentially. Summation of the outputs from the first DAC circuit may occur at a current summation node.

Multiplication by the first matrix D may use multiplication in a complex domain. In some embodiments, the N digital values may correspond to real and imaginary portions (i.e., in-phase and out-of-phase components) of a block of N complex values having complex conjugate symmetry. In some embodiments, the N digital values may correspond to real and imaginary portions of a block of N/2 complex values. In some embodiments, the N digital values may correspond to a block of N real values.

The first DAC circuit may include M DACs. M may be between 1 and N. The first DAC circuit may include a plurality of DACs and wherein each of the DACs includes an analog weight $\alpha$.

The first sign-adjustment circuit may include M XOR gates. The N first output signals may equal the N digital values.

In some embodiments, the first linear transformation circuit may implement several instances of the first linear transformation sequentially. Each sequential instance of the first linear transformation may use an inverse discrete Fourier transform (IDFT) structure with a radix of M. In some embodiments, the first linear transformation circuit may implement several instances of the first linear transformation in parallel. Each parallel instance of the first linear transformation may have a radix of M.

In another embodiment, a second device is described. The second device may include a second linear transformation circuit to implement multiplication by a second matrix D. The second linear transformation circuit may have a second input to receive the vector having N digital values and a third output to output N second output signals, and an output circuit coupled to the second linear transformation circuit. The output circuit may implement DAC on a subset including at least M of the N second output signals in accordance with a second set of coefficients H and may adjust signs of the subset in accordance with the second set of coefficients H. Outputs from the output circuit may be summed to produce a fourth output.

In another embodiment, a third device is described. The third device may include a second output-selection circuit having a third input to receive the vector having N digital values. The second output-selection circuit may select a first subset of the N digital values in accordance with a set of coefficients Hi. A second DAC circuit may be coupled to N outputs from the second output-selection circuit. The second DAC circuit may include a first analog weight $\alpha_1$. N outputs from the second DAC circuit may be summed to generate a fifth output. Summation of the N outputs from the second DAC circuit may occur at a current summation node.

The set of coefficients $H_1$ and the first analog weight $\alpha_1$ may correspond to a decomposition of the IDFT. The fifth output may correspond to the IDFT of the vector.

The third device may further include a third output-selection circuit having a fourth input to receive the vector. The third output-selection circuit may select a second subset of the N digital values in accordance with a set of coefficients $H_2$. A third DAC circuit may be coupled to N outputs from the third output-selection circuit. The third DAC circuit may include a second analog weight $\alpha_2$. N outputs from the third DAC circuit may be summed and combined with the N outputs from the second DAC circuit to produce the fifth output.

The set of coefficients $H_1$ and the set of coefficients $H_2$ may include 0, 1 and −1. The first analog weight $\alpha_1$ and the second analog weight $\alpha_2$ may be 1 and/or 0.707.

The second output-selection circuit may include N XOR gates and the third output-selection circuit may include N XOR gates. The fifth output may have a radix of M. M may equal N.

The second DAC circuit and the third DAC circuit may each include N DACs.

In another embodiment, a process is described. A fourth linear transformation may be performed on the vector having N digital values. The fourth linear transformation may correspond to multiplication by a third matrix D. A subset of outputs from the fourth linear transformation may be selected in accordance with a third set of coefficients H. Signs of the selected subset may be modified in accordance with the third set of coefficients H. DAC may be performed on outputs from the modifying. Outputs from the DAC may be summed to produce a sixth output.

In another embodiments, a fourth device is described. The fourth device includes an analog-to-digital-conversion (ADC) circuit having a fifth input and a seventh output including N first digital output signals, a second sign-adjustment circuit to adjust signs of a subset including at least M of the N first digital output signals in accordance with a fourth set of coefficients H, and a fifth linear transformation circuit to implement multiplication by a fourth matrix D. The fifth linear transformation circuit has a sixth input to receive the N first digital output signals and an eighth output to output N digital values.

In another embodiments, a fifth device is described. The fifth device includes an input circuit. The input circuit has a seventh input and a ninth output including N second digital output signals. The input circuit implements ADC on a subset including at least M of the N first output signals in accordance with a fifth set of coefficients H and adjusts signs of the subset in accordance with the fifth set of coefficients H. A sixth linear transformation circuit coupled to the input circuit is to implement multiplication by a fifth matrix D. The sixth linear transformation circuit has an eighth input to receive the N second digital output signals and a tenth output to output N digital values.

In another embodiments, a sixth device is described. The sixth device includes an ADC circuit having a ninth input and N digital outputs. The ADC circuit includes a third analog weight $\alpha$. A fourth output-selection circuit having a tenth input to receive the N outputs and an eleventh output for the vector having N digital values. The fourth output-selection circuit selects a subset of the N digital outputs in accordance with a sixth set of coefficients H.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

In order to better appreciate the embodiments of the one or more circuits described below, a circuit 200, shown in FIG. 2, for implementing an IDFT is described. In circuit 200, a vector X 210 having N input bits is coupled to registers 212. Appropriate register 212 contents are summed and/or summed and weighted using weights W at nodes 214. Resulting values are coupled to registers 216. Appropriate register 216 contents are summed and/or summed and weighted using weights W at nodes 218. Resulting values are coupled to registers 220. Appropriate register 220 contents are summed at nodes 222 and coupled to a multiplexer 224. An output from the multiplexer 224 is coupled to DAC 226 to generate the output V 120.

In exemplary circuit 200, the number of input bits N is 8 and the DAC 226 is an 11-bit DAC. The IDFT in the circuit 200 may use a radix of 2, 4 or 8, or may use a mixed radix. On moving from left to right in circuit 200, a number of bits of precision increases. Henceforth in this discussion, summation and/or weighting at nodes, such as the nodes 214, may be represented by an operation A and registers $\phi$ (p (e.g., the registers 216). The operation A is sometimes referred to as a butterfly. In circuit 200, therefore, there is a cascade of nodes, operation A and registers $\phi$.

In the embodiments of the one or more circuits described below, a linear transformation, such as at least a portion of the IDFT and/or the DFT, and a conversion, such as ADC and/or DAC, are implemented and optimized concurrently. Such concurrent optimization may allow a reduction in power consumption, circuit size and/or circuit complexity. For example, an output signal from the one or more circuits may reduce an excess current overhead for a given output signal voltage amplitude.

The embodiments of the one or more circuits may include two stages or parts. One part may be implemented in the analog domain and may include summation and/or subtraction operations. Another part may be implemented in the digital domain. This portion may be less complex, i.e., having fewer gates and/or fewer summation/multiplication operations, than existing implementations of the IDFT and/or the DFT.

Embodiments of one or more of the circuits (e.g., circuit 300, 400, 500 or 600) described below may be included as a sub-block in one or more circuits and/or devices. The devices may include devices that implement digital subscriber lines (DSL), serial links, discrete multi-tone transmitters, video broadcasts, audio broadcasts, intra-chip communications, wireless local area networks (WLAN), memory devices (e.g., integrated circuit memory devices), and/or generalized transmitters. Generalized transmitters include transmitters and/or receivers that may be configured to implement and/or may be adapted to implement a linear transformation, such as at least a portion of the IDFT and/or the DFT. The one or more circuits may be used in a communications system.

Figure 3:
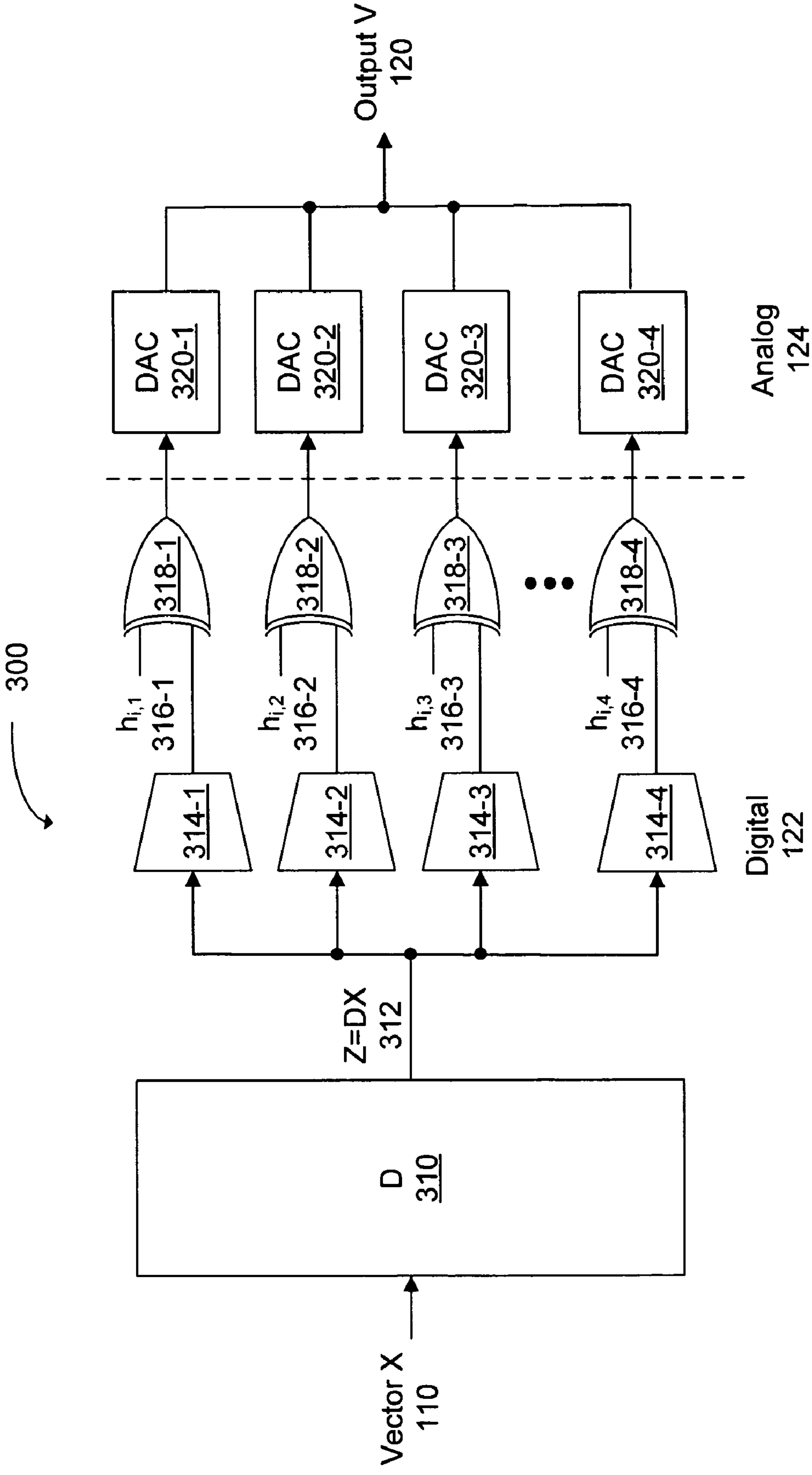
FIG. 3 is a block diagram illustrating an embodiment of a circuit.

Attention is now directed towards embodiments of the one or more circuits. FIG. 3 is a block diagram illustrating an embodiment of a circuit 300. The circuit 300 includes a portion in the digital domain 122 and a portion in the analog domain 124. The portion in the digital domain 122 implements the IDFT, or sub-block of the IDFT, drives an array of M DACs 320 in the analog domain 124.

An input to the circuit is vector X. Vector X 110 may include N data streams of bits or symbols. Exemplary values of N are 4, 8, 16, 32, 64, and 128. In an exemplary embodiment, the vector X 110 has N parallel data streams and M equals 4.

The vector X 110 is multiplied by a matrix D in pre-processor 310 to generate first intermediate output Z 312 equal to DX. The first intermediate output Z 312 has N parallel data streams. The matrix D corresponds to a linear transformation of the input vector X 110. The first intermediate output Z 312 may be coupled in parallel to M parallel-to-serial converters 314. In other embodiments, there may be fewer or more parallel-to-serial converters 314, i.e., a different value of M, with a commensurate impact in the data rates of the second intermediate outputs. The M parallel-to-serial converters 314 function as an N to M multiplexer.

The second intermediate outputs may be coupled to an output-selection/sign-change circuit. The sign-change circuit may be implemented using M XOR gates 318. The sign changes of the second intermediate outputs may be in accordance with a set of coefficients H 316, including $h_{i,1}$, $h_{i,2}$, $h_{i,3}$ and $h_{i,4}$.

Outputs from the M DACs 320 may be current summed to generate the output V 120. The output V 120 from the M DACs 320 may include analog signals corresponding to the IDFT transformation of the N data streams in the vector X 110 at a data rate that is N times that of the corresponding data rate of at least one of the N data streams in the vector X 110. In some embodiments, the output V 120 may be asserted on a communication line or bus by a transmitter or driver circuit (not shown in Figure ), thereby transmitting output V 120 to a receiving circuit device or device.

In some embodiments, the circuit 300 may include a finite state machine (FSM) and/or control logic. Alternatively, the control logic may be implemented outside of the circuit 300. The FSM and/or the control logic may provide control signals to one or more components in the digital domain 122. The control signals may configure, adjust and/or program one or more of these components. For example, in some embodiments the pre-processor 310 may include a plurality of fixed gain drivers and/or a plurality of programmable drivers. The FSM and/or the control logic may adjust values of the programmable drivers and/or the set of coefficients H 316. In some embodiments, the control signals may be fixed over two or more time intervals corresponding to a bit or symbol period for at least one of the N data streams in the vector X 110.

In some embodiments, the circuit 300 may have fewer or more components. Functions of two or more components may be implemented in a single component. Alternatively, functions of some components may be implemented in additional instances of the components. For example, in some embodiments there may be more than one FSM, more than one control logic and/or one or more external interfaces. There may be one or more additional stages in the digital domain 122 and/or the analog domain 124. In some embodiments, signals from one or more FSMs may supplement and/or replace one or more clock signals. There may be more than one instance of the circuit 300. Each instance of the circuit 300 may be applied to a respective vector, such as the vector X 110.

In some embodiments, one or more instances of the circuit 300 may implement linear precoding or cyclic padding of one or more of the N data streams. One or more instances of the circuit 300 may apply a different weight to respective data streams. In an alternate embodiment, the circuit 300 may include multiple instances of the portion in the digital domain 122 coupled to the portion in the analog domain 124 using a router or a multiplexer. In some embodiments, the circuit 300 may include a rotation circuit, such as a one or more-tap equalizers, which modify a respective phase of the digital data symbols or bits (or a subset of the digital data symbols or bits) in one or more of the N data streams. In some embodiments, the equalizers may be complex, i.e., adjusting a magnitude and a phase of the data symbols.

The N data streams may corresponding to one or more sub-channels in a multi-channel communications link. In embodiments where the N data streams correspond to a passband sub-channel, such as in a multi-tone link, additional components after the circuit 300 may modulate the output V 120. The modulation may heterodyne or modulate the information in the output V 120 to a band of frequencies corresponding to the passband sub-channel.

In some embodiments, one or more of the N data streams in the vector X 110 may include real values or symbols. In other embodiments, one or more of the N data streams in the vector X 110 may include complex values or symbols that have an in-phase (I) component and an out-of-phase (Q) component. The Q component may be 90° out of phase with respect to the I component. In some embodiments, symbols in one or more of the N data streams in the vector X 110 may be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) or sixteen-level pulse amplitude modulation (16PAM). In embodiments where at least one of the N data streams corresponds to a passband sub-channel, i.e., a band of frequencies not including DC, on-off keying (OOK), may be used. Suitable coding corresponding to one or more passband sub-channels may also include quadrature amplitude modulation (QAM).

Figure 2:
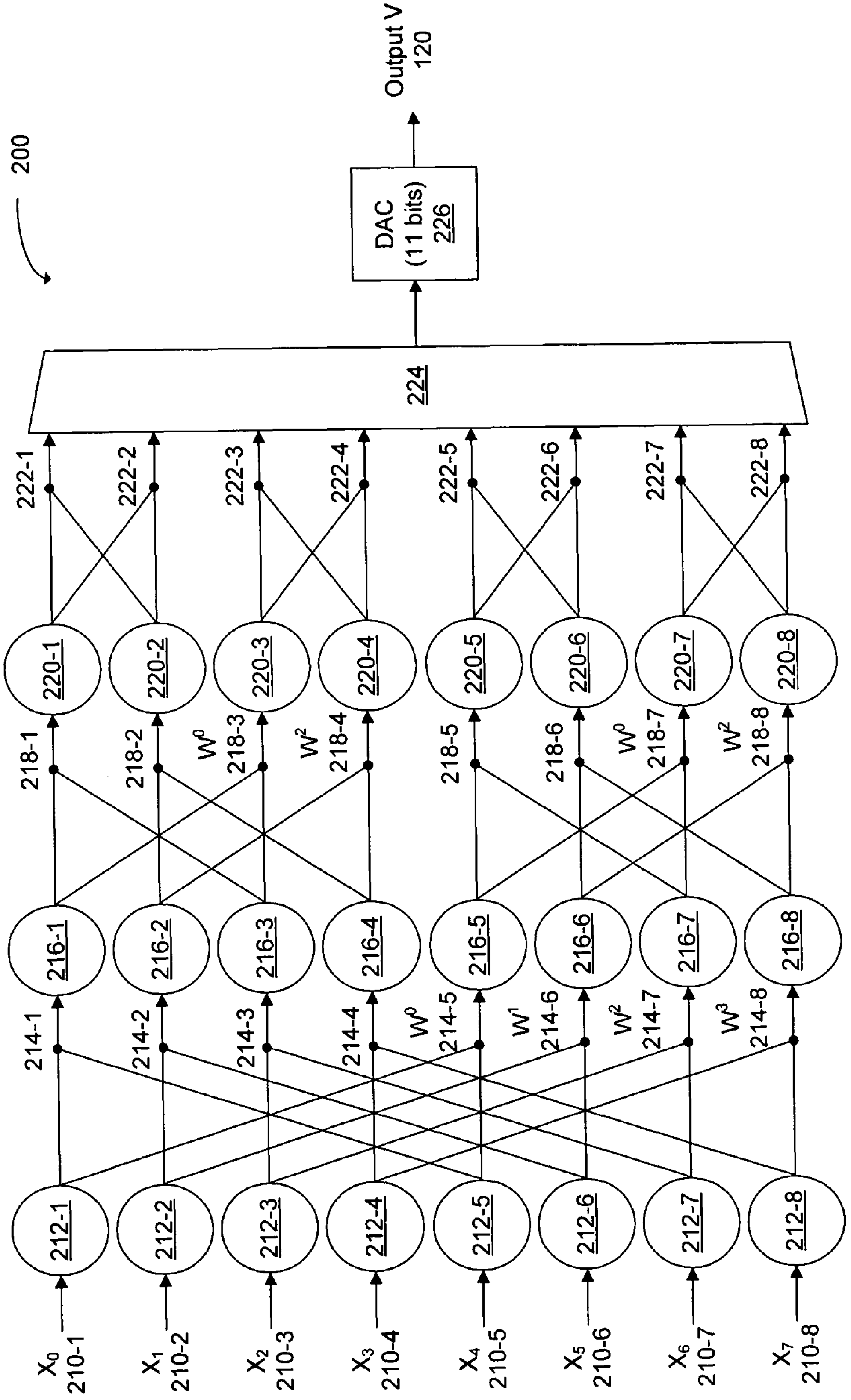
Figure 2 (Prior Art)
FIG. 2 is a block diagram illustrating an embodiment of circuit that implements an inverse discrete Fourier transform (IDFT).

The circuit 300 may perform a less complex digital computation and may operate faster (for a given power) relative to some alternative circuits, such as circuit 200 (FIG. 2). This may be a consequence of moving some of the summations and subtractions associated with the IDFT to the analog domain 124 (in general, summation and/or subtraction in the analog domain 124 is faster and utilizes less complicated circuitry than computationally equivalent implementations in the digital domain 122). The circuit 300 may achieve these results without significant additional output current overhead relative to some alternative circuits. The reduced digital complexity and speed of operation of the circuit 300 may be of use in applications such as links operating at a high data rate, such as a data rate of 10 Gbps or higher. Circuit 300 may utilize a modular design (e.g., with each module include a parallel-to-serial converter 314 and an XOR gate 318), which reduces complexity and increases reliability.

Mathematically, circuit 300, and other embodiments described below with reference to FIGS. 4, 5 and 6, implement a decomposition of transformations such as the IDFT and DFT. Attention is now directed towards a discussion of such decompositions.

As illustrated in the circuit 300, in the digital domain 122 the first intermediate output Z 312 equals DX. The output V 120, in turn, equals HZ. Thus, V equals HDX. The set of coefficients H 316, which guide or control selection from Z and summations that occur in the analog domain 124, includes 0 and/or ±1. As a consequence, generating HZ includes the analog operations of summation and/or subtraction. The number of non-zero elements in each row of the set of coefficients H 316 is equal to or less than M, the number of DACs 320.

The embodiment illustrated in the circuit 300 may be generalized in several ways. For example, the set of coefficients H 316 may be decomposed as $$\sum_m \alpha_m H_m,$$

where $H_m$ includes 0 and/or ±1 and $\alpha_m$ is a weight. In an exemplary embodiment, $\alpha_m$ may be $$\frac{1}{\sqrt{2}}.$$

More generally, the output V 120 may be expressed as $$\sum_m \alpha_m H_m D_m X,$$

where $D_m X$ is implemented in the digital domain 122. Thus, the embodiments of the one or more circuits may include analog summation and/or subtraction, and may or may not include multiplication by the matrix D, i.e., a linear transformation.

The matrix D and the set of coefficients H 316 may be determined in a variety of ways. Consider the IDFT as an example. The IDFT operation may be described as a linear transformation of an input $$IDFT(X)=FX=HDX,$$

where F is the IDFT matrix and X is the input, such as the vector X 110. H and D are the desired decomposition of F.

As illustrated by circuit 200 (FIG. 2), the IDFT matrix F may be decomposed into a series of matrices corresponding to the summation and weighting at the nodes A (i.e., the butterflies), $$IDFT=A_k\phi_{k-1}A_{k-1}\ldots\phi_2A_2\phi_1A_1X.$$

Note that the $A_k$ matrices are IDFT matrices each having a smaller radix than the full IDFT matrix F.

Using this formalism, one could determine the matrix D and the set of coefficients H 316 as $$D=B\phi_jA_j\ldots\phi_2A_2\phi_1A_1$$

and $$H=A_k\phi_{k-1}A_{k-1}\ldots A_{j+1}B^{31\ 1}.$$

where B is a suitable matrix to make D and H sparse matrices. Another possibility is to define the set of coefficients H 316 as a well-structured matrix and then to determine the matrix D using $$D=H^{-1}F,$$

where $H^{-1}$ is the inverse of H. In exemplary embodiments, the set of coefficients H 316 may be the coefficients of a Hadamard matrix. In another exemplary embodiment, the set of coefficients H 316 may correspond to a particular phase quantization, such as ±1 along a real (in-phase or I) axis and/or ±j along an imaginary (out-of-phase or Q) axis.

Attention is now directed towards several examples of such decompositions for the IDFT (the DFT may be decomposed using a similar technique). As an illustration, an 8-point IDFT is considered, although the approach may be utilized for vectors, such as the vector X 110, having fewer or more symbols or bits. Unless indicated otherwise, in these examples the vector X 110 and the output V 120 are each complex variables. The real and imaginary portions of each may be treated as real.

In a first example implementing (1+j)IDFT (where j is used to indicate a 90° phase shift with respect to 1), M is 8, $$H=\begin{bmatrix}
1&1&1&1&0&0&0&0&1&1&-1&-1&0&0&0&0\\
1&-1&-1&1&0&0&0&0&-1&-1&1&1&0&0&0&0\\
1&-1&1&-1&0&0&0&0&-1&1&-1&1&0&0&0&0\\
1&1&-1&-1&0&0&0&0&-1&1&1&-1&0&0&0&0\\
0&0&0&0&1&1&1&1&0&0&0&0&-1&-1&-1&-1\\
0&0&0&0&1&-1&-1&1&0&0&0&0&-1&-1&1&1\\
0&0&0&0&1&-1&1&-1&0&0&0&0&-1&1&-1&1\\
0&0&0&0&1&1&-1&-1&0&0&0&0&-1&1&1&-1\\
1&1&1&1&0&0&0&0&1&1&1&1&0&0&0&0\\
1&1&-1&-1&0&0&0&0&1&-1&-1&1&0&0&0&0\\
1&-1&1&-1&0&0&0&0&1&-1&1&-1&0&0&0&0\\
1&-1&-1&1&0&0&0&0&1&1&-1&-1&0&0&0&0\\
0&0&0&0&1&1&1&1&0&0&0&0&1&1&1&1\\
0&0&0&0&1&1&-1&-1&0&0&0&0&1&-1&-1&1\\
0&0&0&0&1&-1&1&-1&0&0&0&0&1&-1&1&-1\\
0&0&0&0&1&-1&-1&1&0&0&0&0&1&1&-1&-1
\end{bmatrix}$$

-continued and $$D = \begin{bmatrix}
a & 0 & 0 & 0 & a & 0 & 0 & 0 & -a & 0 & 0 & 0 & -a & 0 & 0 & 0 \\
0 & 0 & 0 & a & 0 & 0 & 0 & a & 0 & 0 & 0 & -a & 0 & 0 & 0 & -a \\
0 & 0 & a & 0 & 0 & 0 & a & 0 & 0 & 0 & -a & 0 & 0 & 0 & -a & 0 \\
0 & a & 0 & 0 & 0 & a & 0 & 0 & 0 & -a & 0 & 0 & 0 & -a & 0 & 0 \\
a & 0 & 0 & 0 & -a & 0 & 0 & 0 & -a & 0 & 0 & 0 & a & 0 & 0 & 0 \\
0 & 0 & 0 & 0 & 0 & 0 & 0 & 0 & 0 & 0 & 0 & 1 & 0 & 0 & 0 & -1 \\
0 & 0 & a & 0 & 0 & 0 & -a & 0 & 0 & 0 & a & 0 & 0 & 0 & -a & 0 \\
0 & 1 & 0 & 0 & 0 & -1 & 0 & 0 & 0 & 0 & 0 & 0 & 0 & 0 & 0 & 0 \\
a & 0 & 0 & 0 & a & 0 & 0 & 0 & a & 0 & 0 & 0 & a & 0 & 0 & 0 \\
0 & 0 & 0 & a & 0 & 0 & 0 & a & 0 & 0 & 0 & a & 0 & 0 & 0 & a \\
0 & 0 & a & 0 & 0 & 0 & a & 0 & 0 & 0 & a & 0 & 0 & 0 & a & 0 \\
0 & a & 0 & 0 & 0 & a & 0 & 0 & 0 & a & 0 & 0 & 0 & a & 0 & 0 \\
a & 0 & 0 & 0 & -a & 0 & 0 & 0 & a & 0 & 0 & 0 & -a & 0 & 0 & 0 \\
0 & 0 & 0 & -1 & 0 & 0 & 0 & 1 & 0 & 0 & 0 & 0 & 0 & 0 & 0 & 0 \\
0 & 0 & -a & 0 & 0 & 0 & a & 0 & 0 & 0 & a & 0 & 0 & 0 & -a & 0 \\
0 & 0 & 0 & 0 & 0 & 0 & 0 & 0 & 0 & 1 & 0 & 0 & 0 & -1 & 0 & 0
\end{bmatrix},$$

where a is $$\frac{1}{\sqrt{2}}.$$

In this example, D may be used to implement two radix four IDFTs in parallel, i.e., each IDFT sub-block operates on four of the symbols or bits in the vector X 110 and generates two sets of outputs each having 8 symbols or bits. The set of coefficients H 316 may be used to perform a radix four IDFT on the 8 symbols or bits in each set of outputs and to rotate the result by 45°, i.e., the multiplication by 1+j in the complex domain.

In a second example implementing the IDFT, M is 4, $$H = \begin{bmatrix}
1 & 1 & 1 & 1 & 0 & 0 & 0 & 0 & 0 & 0 & 0 & 0 & 0 & 0 & 0 & 0 \\
1 & 0 & -1 & 0 & 0 & 0 & 0 & 0 & 0 & -1 & 0 & 1 & 0 & 0 & 0 & 0 \\
1 & -1 & 1 & -1 & 0 & 0 & 0 & 0 & 0 & 0 & 0 & 0 & 0 & 0 & 0 & 0 \\
1 & 0 & -1 & 0 & 0 & 0 & 0 & 0 & 0 & 1 & 0 & -1 & 0 & 0 & 0 & 0 \\
0 & 0 & 0 & 0 & 1 & 1 & 1 & 1 & 0 & 0 & 0 & 0 & 0 & 0 & 0 & 0 \\
0 & 0 & 0 & 0 & 1 & 0 & -1 & 0 & 0 & 0 & 0 & 0 & 0 & -1 & 0 & 1 \\
0 & 0 & 0 & 0 & 1 & -1 & 1 & -1 & 0 & 0 & 0 & 0 & 0 & 0 & 0 & 0 \\
0 & 0 & 0 & 0 & 1 & 0 & -1 & 0 & 0 & 0 & 0 & 0 & 0 & 1 & 0 & -1 \\
0 & 0 & 0 & 0 & 0 & 0 & 0 & 0 & 1 & 1 & 1 & 1 & 0 & 0 & 0 & 0 \\
0 & 1 & 0 & -1 & 0 & 0 & 0 & 0 & 1 & 0 & -1 & 0 & 0 & 0 & 0 & 0 \\
0 & 0 & 0 & 0 & 0 & 0 & 0 & 0 & 1 & -1 & 1 & -1 & 0 & 0 & 0 & 0 \\
0 & -1 & 0 & 1 & 0 & 0 & 0 & 0 & 1 & 0 & -1 & 0 & 0 & 0 & 0 & 0 \\
0 & 0 & 0 & 0 & 0 & 0 & 0 & 0 & 0 & 0 & 0 & 0 & 1 & 1 & 1 & 1 \\
0 & 0 & 0 & 0 & 0 & 1 & 0 & -1 & 0 & 0 & 0 & 0 & 1 & 0 & -1 & 0 \\
0 & 0 & 0 & 0 & 0 & 0 & 0 & 0 & 0 & 0 & 0 & 0 & 1 & -1 & 1 & -1 \\
0 & 0 & 0 & 0 & 0 & -1 & 0 & 1 & 0 & 0 & 0 & 0 & 1 & 0 & -1 & 0
\end{bmatrix}$$

-continued and $$D = \begin{bmatrix}
1 & 0 & 0 & 0 & 1 & 0 & 0 & 0 & 0 & 0 & 0 & 0 & 0 & 0 & 0 & 0 \\
0 & 0 & 0 & 1 & 0 & 0 & 0 & 1 & 0 & 0 & 0 & 0 & 0 & 0 & 0 & 0 \\
0 & 0 & 1 & 0 & 0 & 0 & 1 & 0 & 0 & 0 & 0 & 0 & 0 & 0 & 0 & 0 \\
0 & 1 & 0 & 0 & 0 & 1 & 0 & 0 & 0 & 0 & 0 & 0 & 0 & 0 & 0 & 0 \\
1 & 0 & 0 & 0 & -1 & 0 & 0 & 0 & 0 & 0 & 0 & 0 & 0 & 0 & 0 & 0 \\
0 & 0 & 0 & a & 0 & 0 & 0 & a & 0 & 0 & 0 & a & 0 & 0 & 0 & a \\
0 & 0 & 0 & 0 & 0 & 0 & 0 & 0 & 0 & 0 & 1 & 0 & 0 & 0 & -1 & 0 \\
0 & a & 0 & 0 & 0 & a & 0 & 0 & 0 & a & 0 & 0 & 0 & a & 0 & 0 \\
0 & 0 & 0 & 0 & 0 & 0 & 0 & 0 & 1 & 0 & 0 & 0 & 1 & 0 & 0 & 0 \\
0 & 0 & 0 & 0 & 0 & 0 & 0 & 0 & 0 & 0 & 0 & 1 & 0 & 0 & 0 & 1 \\
0 & 0 & 0 & 0 & 0 & 0 & 0 & 0 & 0 & 0 & 1 & 0 & 0 & 0 & 1 & 0 \\
0 & 0 & 0 & 0 & 0 & 0 & 0 & 0 & 0 & 1 & 0 & 0 & 0 & 1 & 0 & 0 \\
0 & 0 & 0 & 0 & 0 & 0 & 0 & 0 & 1 & 0 & 0 & 0 & -1 & 0 & 0 & 0 \\
0 & 0 & 0 & a & 0 & 0 & 0 & a & 0 & 0 & 0 & a & 0 & 0 & 0 & a \\
0 & 0 & -1 & 0 & 0 & 0 & 1 & 0 & 0 & 0 & 0 & 0 & 0 & 0 & 0 & 0 \\
0 & a & 0 & 0 & 0 & a & 0 & 0 & 0 & a & 0 & 0 & 0 & a & 0 & 0
\end{bmatrix},$$

where a is $$\frac{1}{\sqrt{2}}.$$

In this example, D may be used to implement four radix two IDFTs in parallel, i.e., each IDFT sub-block operates on four of the symbols or bits in the vector X 110 and generates two sets of outputs each having 8 symbols or bits. The set of coefficients H 316 may be used to perform a radix four IDFT on the 8 symbols or bits in each set of outputs.

In a third example implementing the IDFT, M is 2, $$H = \begin{bmatrix}
1 & 1 & 0 & 0 & 0 & 0 & 0 & 0 & 0 & 0 & 0 & 0 & 0 & 0 & 0 & 0 \\
1 & -1 & 0 & 0 & 0 & 0 & 0 & 0 & 0 & 0 & 0 & 0 & 0 & 0 & 0 & 0 \\
0 & 0 & 1 & 1 & 0 & 0 & 0 & 0 & 0 & 0 & 0 & 0 & 0 & 0 & 0 & 0 \\
0 & 0 & 1 & -1 & 0 & 0 & 0 & 0 & 0 & 0 & 0 & 0 & 0 & 0 & 0 & 0 \\
0 & 0 & 0 & 0 & 1 & 1 & 0 & 0 & 0 & 0 & 0 & 0 & 0 & 0 & 0 & 0 \\
0 & 0 & 0 & 0 & 1 & -1 & 0 & 0 & 0 & 0 & 0 & 0 & 0 & 0 & 0 & 0 \\
0 & 0 & 0 & 0 & 0 & 0 & 1 & 1 & 0 & 0 & 0 & 0 & 0 & 0 & 0 & 0 \\
0 & 0 & 0 & 0 & 0 & 0 & 1 & -1 & 0 & 0 & 0 & 0 & 0 & 0 & 0 & 0 \\
0 & 0 & 0 & 0 & 0 & 0 & 0 & 0 & 1 & 1 & 0 & 0 & 0 & 0 & 0 & 0 \\
0 & 0 & 0 & 0 & 0 & 0 & 0 & 0 & 1 & -1 & 0 & 0 & 0 & 0 & 0 & 0 \\
0 & 0 & 0 & 0 & 0 & 0 & 0 & 0 & 0 & 0 & 1 & 1 & 0 & 0 & 0 & 0 \\
0 & 0 & 0 & 0 & 0 & 0 & 0 & 0 & 0 & 0 & 1 & -1 & 0 & 0 & 0 & 0 \\
0 & 0 & 0 & 0 & 0 & 0 & 0 & 0 & 0 & 0 & 0 & 0 & 1 & 1 & 0 & 0 \\
0 & 0 & 0 & 0 & 0 & 0 & 0 & 0 & 0 & 0 & 0 & 0 & 1 & -1 & 0 & 0 \\
0 & 0 & 0 & 0 & 0 & 0 & 0 & 0 & 0 & 0 & 0 & 0 & 0 & 0 & 1 & 1 \\
0 & 0 & 0 & 0 & 0 & 0 & 0 & 0 & 0 & 0 & 0 & 0 & 0 & 0 & 1 & -1
\end{bmatrix},$$

-continued and $$D=\begin{bmatrix}1&0&1&0&1&0&1&0&0&0&0&0&0&0&0&0\\0&1&0&1&0&1&0&1&0&0&0&0&0&0&0&0\\1&0&0&0&-1&0&0&0&0&0&1&0&0&0&-1&0\\0&a&0&a&0&a&0&a&0&a&0&a&0&a&0&a\\1&0&-1&0&1&0&-1&0&0&0&0&0&0&0&0&0\\0&0&0&0&0&0&0&0&0&1&0&-1&0&1&0&-1\\1&0&0&0&-1&0&0&0&0&0&-1&0&0&0&1&0\\0&a&0&a&0&a&0&a&0&a&0&a&0&a&0&a\\0&0&0&0&0&0&0&0&1&0&1&0&1&0&1&0\\0&0&0&0&0&0&0&0&0&1&0&1&0&1&0&1\\0&0&-1&0&0&0&1&0&1&0&0&0&-1&0&0&0\\0&a&0&a&0&a&0&a&0&a&0&a&0&a&0&a\\0&0&0&0&0&0&0&0&1&0&-1&0&1&0&-1&0\\0&-1&0&1&0&-1&0&1&0&0&0&0&0&0&0&0\\0&0&1&0&0&0&-1&0&1&0&0&0&-1&0&0&0\\0&a&0&a&0&a&0&a&0&a&0&a&0&a&0&a\end{bmatrix},$$

where a is $$\frac{1}{\sqrt{2}}.$$

In this example, D may be used to implement two radix four IDFTs in parallel, i.e., each IDFT sub-block operates on eight of the symbols or bits in the vector X 110 and generates four sets of outputs each having 4 symbols or bits. The set of coefficients H 316 may be used to perform a radix two IDFT on the 4 symbols or bits in each set of outputs.

In another example, the linear transformation of the IDFT operation and/or the DFT operation may be described as a superposition of two linear transformations of an input. For example, $$IDFT(X)=FX=(\alpha_1 H_1+\alpha_2 H_2)DX.$$

Here the matrices H correspond to two sets of coefficients having different weights, $\alpha_1$ and $\alpha_2$. Each of the sets of coefficients corresponds to current summations in the analog domain 124 For M=16, i.e., 16 DACs 320 having the weight $\alpha_1$ equal to 0.2706 and 16 DACs 320 having the weight $\alpha_2$ equal to 0.6533, the DFT may be decomposed as $$H_1=\begin{bmatrix}1&1&1&1&1&1&1&1&-1&-1&-1&-1&-1&-1&-1&-1\\1&1&-1&1&-1&-1&1&-1&-1&1&-1&-1&1&-1&1&1\\1&-1&-1&1&1&-1&-1&1&-1&-1&1&1&-1&-1&1&1\\1&1&1&1&-1&-1&-1&-1&-1&-1&1&1&1&1&-1&-1\\1&-1&1&-1&1&-1&1&-1&-1&1&-1&1&-1&1&-1&1\\1&-1&-1&-1&-1&1&1&1&-1&-1&-1&1&1&1&1&-1\\1&1&-1&-1&1&1&-1&-1&-1&1&1&-1&-1&1&1&-1\\1&-1&1&-1&-1&1&-1&1&-1&1&1&-1&1&-1&-1&1\\1&1&1&1&1&1&1&1&1&1&1&1&1&1&1&1\\1&-1&1&1&-1&1&-1&-1&1&1&-1&1&-1&-1&1&-1\\1&1&-1&-1&1&1&-1&-1&1&-1&-1&1&1&-1&-1&1\\1&1&-1&-1&-1&-1&1&1&1&1&1&1&-1&-1&-1&-1\\-1&-1&1&-1&1&-1&1&-1&1&-1&1&-1&1&-1&1&-1\\1&1&1&-1&-1&-1&-1&1&1&1&1&-1&-1&-1&-1&1\\1&-1&-1&1&1&-1&-1&1&1&1&-1&-1&1&1&-1&-1\\1&-1&-1&1&-1&1&1&-1&1&-1&1&-1&-1&1&-1&1\end{bmatrix},$$

-continued $$H_2 = \begin{bmatrix}
1 & 1 & 1 & 1 & 1 & 1 & 1 & 1 & 1 & 1 & 1 & 1 & 1 & 1 & 1 & 1 \\
1 & 1 & 1 & -1 & -1 & -1 & -1 & 1 & 1 & -1 & -1 & -1 & -1 & 1 & 1 & 1 \\
1 & 1 & -1 & -1 & 1 & 1 & -1 & -1 & 1 & -1 & -1 & 1 & 1 & -1 & -1 & 1 \\
1 & -1 & -1 & 1 & -1 & 1 & 1 & -1 & 1 & -1 & 1 & -1 & 1 & -1 & 1 & -1 \\
1 & -1 & 1 & -1 & 1 & -1 & 1 & -1 & 1 & -1 & 1 & -1 & 1 & -1 & 1 & -1 \\
1 & -1 & 1 & 1 & -1 & 1 & -1 & -1 & 1 & 1 & -1 & 1 & -1 & -1 & 1 & -1 \\
1 & -1 & -1 & 1 & 1 & -1 & -1 & 1 & 1 & 1 & -1 & -1 & 1 & 1 & -1 & -1 \\
1 & 1 & -1 & -1 & -1 & -1 & 1 & 1 & 1 & 1 & 1 & 1 & -1 & -1 & -1 & -1 \\
-1 & -1 & -1 & -1 & -1 & -1 & -1 & -1 & 1 & 1 & 1 & 1 & 1 & 1 & 1 & 1 \\
-1 & 1 & 1 & 1 & 1 & -1 & -1 & -1 & 1 & 1 & 1 & -1 & -1 & -1 & -1 & 1 \\
-1 & 1 & 1 & -1 & -1 & 1 & 1 & -1 & 1 & 1 & -1 & -1 & 1 & 1 & -1 & -1 \\
-1 & 1 & -1 & 1 & 1 & -1 & 1 & -1 & 1 & -1 & -1 & 1 & -1 & 1 & 1 & -1 \\
-1 & 1 & -1 & 1 & -1 & 1 & -1 & 1 & 1 & -1 & 1 & -1 & 1 & -1 & 1 & -1 \\
-1 & -1 & 1 & -1 & 1 & 1 & -1 & 1 & 1 & -1 & 1 & 1 & -1 & 1 & -1 & -1 \\
-1 & -1 & 1 & 1 & -1 & -1 & 1 & 1 & 1 & -1 & -1 & 1 & 1 & -1 & -1 & 1 \\
-1 & -1 & -1 & -1 & 1 & 1 & 1 & 1 & 1 & 1 & -1 & -1 & -1 & -1 & 1 & 1
\end{bmatrix},$$

and $$D = \begin{bmatrix}
1 & 0 & 0 & 0 & 0 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 0 & 0 & 0 \\
0 & 0 & 1 & 0 & 0 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 & 0 & 0 & 0 \\
0 & 0 & 0 & 0 & 1 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & 1 & 0 & 0 & 0 \\
0 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & 1
\end{bmatrix}.$$

In some embodiments, the vector X 110 may be conjugate symmetric, i.e., it may have the form $$\begin{bmatrix}
X_0(\text{real}) \\
X_1(\text{real}) \\
X_2(\text{real}) \\
X_3(\text{real}) \\
X_4(\text{real}) \\
X_1(\text{real}) \\
X_2(\text{real}) \\
X_3(\text{real}) \\
0 \\
X_1(\text{imaginary}) \\
X_2(\text{imaginary}) \\
X_3(\text{imaginary}) \\
0 \\
X_1(\text{imaginary}) \\
X_2(\text{imaginary}) \\
X_3(\text{imaginary})
\end{bmatrix}$$

In this case, the output V 120 will be $$\begin{bmatrix}
V_0(\text{real}) \\
V_1(\text{real}) \\
V_2(\text{real}) \\
V_3(\text{real}) \\
V_4(\text{real}) \\
V_5(\text{real}) \\
V_6(\text{real}) \\
V_7(\text{real}) \\
0 \\
0 \\
0 \\
0 \\
0 \\
0 \\
0 \\
0
\end{bmatrix}$$

As a consequence, smaller matrices H and D may be used. For example, the vector X 110 may re-written as $$\begin{bmatrix} X_0(\text{real}) \\ X_1(\text{real}) \\ X_2(\text{real}) \\ X_3(\text{real}) \\ X_4(\text{real}) \\ X_1(\text{imaginary}) \\ X_2(\text{imaginary}) \\ X_3(\text{imaginary}) \end{bmatrix}.$$

and the output V 120 may be re-written as $$\begin{bmatrix} V_0(\text{real}) \\ V_1(\text{real}) \\ V_2(\text{real}) \\ V_3(\text{real}) \\ V_4(\text{real}) \\ V_5(\text{real}) \\ V_6(\text{real}) \\ V_7(\text{real}) \end{bmatrix}.$$

For M equal to 4, the IDFT may be decomposed as $$H = \begin{bmatrix} 1 & 1 & 1 & 1 & 0 & 0 & 0 & 0 \\ 1 & -1 & 1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 0 & 0 & 0 & 0 & 1 & 1 & 1 & 1 \\ 0 & 0 & 0 & 0 & 1 & -1 & 1 & -1 \\ 0 & 0 & 0 & 0 & 1 & 1 & -1 & -1 \\ 0 & 0 & 0 & 0 & 1 & -1 & -1 & 1 \end{bmatrix}$$

and $$D = \begin{bmatrix} 1 & 0 & 0 & 0 & 1 & 0 & 0 & 0 \\ 0 & 0 & 2 & 0 & 0 & 0 & 0 & 0 \\ 0 & 1 & 0 & 1 & 0 & 1 & 0 & -1 \\ 0 & 1 & 0 & 1 & 0 & -1 & 0 & 1 \\ 1 & 0 & 0 & 0 & -1 & 0 & 0 & 0 \\ 0 & 0 & 0 & 0 & 0 & 0 & 2 & 0 \\ 0 & 0 & 0 & 0 & 0 & a & 0 & a \\ 0 & a & 0 & -a & 0 & 0 & 0 & 0 \end{bmatrix},$$

where $\alpha$ equals $\sqrt{2}$.

Attention is now directed to additional embodiments of circuits that implement decompositions of the IDFT. Similar embodiments may be used to implement decompositions of the DFT.

Figure 4:
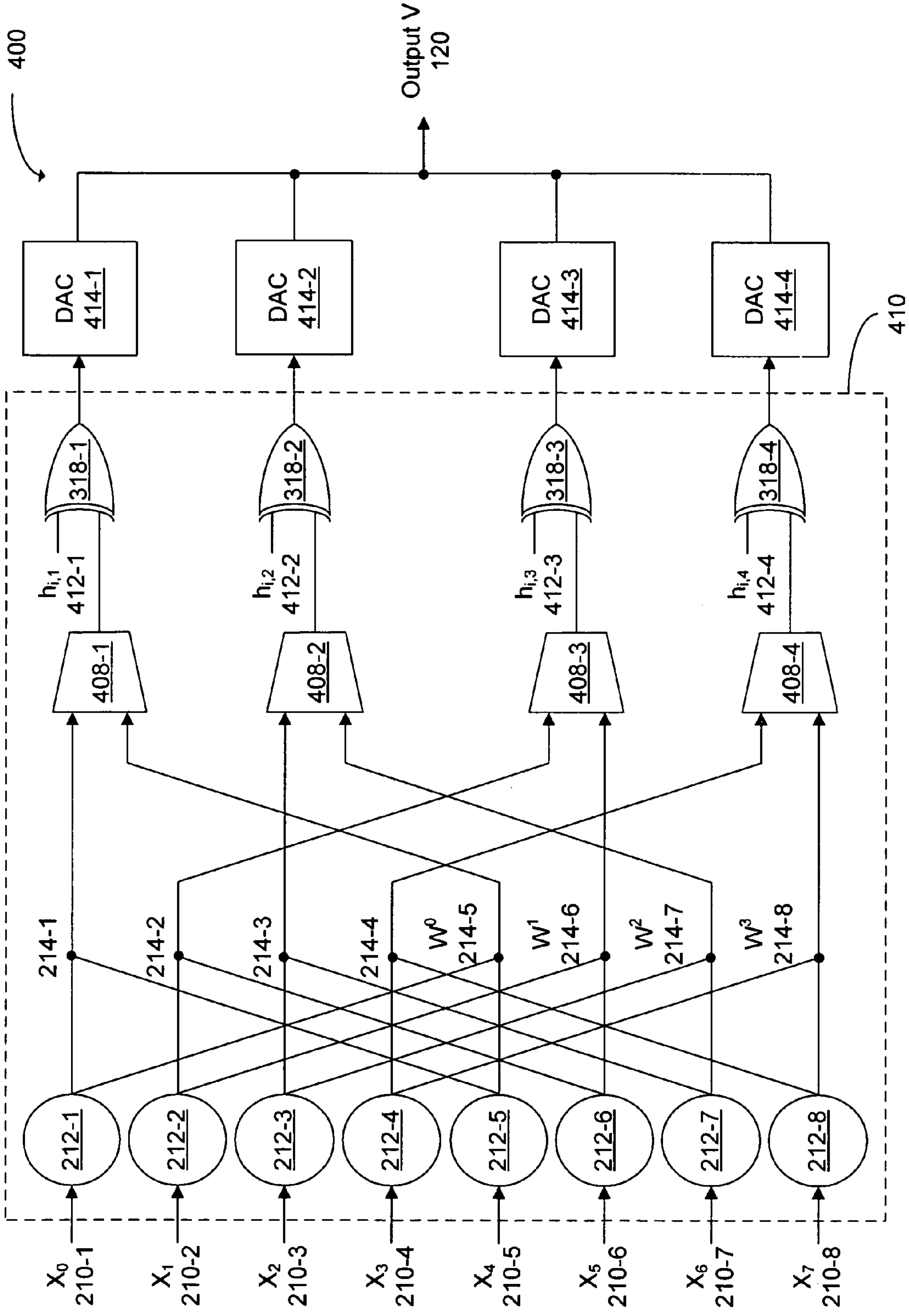
FIG. 4 is a block diagram illustrating an embodiment of a circuit.

FIG. 4 is a block diagram illustrating an embodiment of a circuit 400. The circuit 400 includes a portion in the digital domain 410 and a portion in the analog domain. The portion in the digital domain 410 implements at least a sub-block of an IDFT that drives an array of M DACs 414 (e.g., 9-bit DACs) in the analog domain.

Circuit 400 may have the vector X 210 as an input. The vector X 210 may include N data streams of bits or symbols. While N is illustrated as 8, N may be 4, 16, 32, 64, 128 or more bits or symbols. The vector X 210 may be stored in the registers 212. Appropriate register 212 contents are summed, or weighted and summed using weights W at the nodes 214, thereby implementing a linear transformation corresponding to a subset of the IDFT. Resulting outputs are coupled to M multiplexers 408. In the circuit 400, M is illustrated as 4. In other embodiments, M may be larger or smaller. In an exemplary embodiment, M is a value between 1 and N.

The M multiplexers 408 may selectively couple outputs (from nodes 214) to the M XOR gates 318. The M XOR gates 318 may implement sign changes of the outputs from the nodes 214 in accordance with the set of coefficients H 412.

Outputs from the M DACs 414 may be electrical currents that are summed at a circuit node to generate the output V 120. The output V 120 from the M DACs 414 may include analog signals corresponding to the IDFT transformation of N data streams in the vector X 210 at a data rate that is 1/M (e.g. ¼, ⅛, or 1/16) of the corresponding Nyquist rate for at least one of the N data streams in the vector X 210.

In some embodiments, the circuit 400 may include a finite state machine (FSM) and/or control logic. Alternatively, the control logic may be implemented outside of the circuit 400. The FSM and/or the control logic may provide control signals to one or more components in the digital domain 410. The control signals may configure, adjust and/or program one or more of these components. For example, in some embodiments the weights at the nodes 214 may be implemented using a plurality of fixed gain drivers and/or a plurality of programmable drivers. The FSM and/or the control logic may adjust values of the programmable drivers and/or the set of coefficients H 412. In some embodiments, the control signals may be fixed over two or more time intervals corresponding to a bit or symbol period for at least one of the N data streams in the vector X 210.

In some embodiments, the circuit 400 may have fewer or more components. Positions of two or more components may be interchanged. For example, the positions of the XOR gates 318 and the multiplexers 408 can be interchanged, although that may increase the number of XOR gates used. Functions of two or more components may be implemented in a single component. Alternatively, functions of some components may be implemented in additional instances of the components. For example, in some embodiments there may be more than one FSM, more than one control logic and/or one or more external interfaces. There may be one or more additional stages in the digital domain 410 and/or the analog domain. In some embodiments, signals from one or more FSMs may supplement and/or replace one or more clock signals. There may be more than one instance of the circuit 400. Each instance of the circuit 400 may be applied to a respective vector, such as the vector X 210.

In some embodiments, one or more instances of the circuit 400 may implement linear precoding or cyclic padding of one or more of the N data streams. One or more instances of the circuit 400 may apply a different weight to respective data streams. In an alternate embodiment, the circuit 400 may include multiple instances of the portion in the digital domain 410 coupled to the portion in the analog domain using a router or a multiplexer. In some embodiments, in order to modify a respective phase of the at least a subset of the digital data symbols or bits in one or more of the N data streams, the circuit 400 may include a rotation circuit, such as a one or more-tap equalizer. In some embodiments, the equalizer may be complex, i.e., adjusting a magnitude and/or a phase of a respective data stream.

The N data streams may corresponding to one or more sub-channels in a multi-channel communications link. In embodiments where the N data streams correspond to a passband sub-channel, such as in a multi-tone link, additional components after the circuit 400 may modulate the output V 120. The modulation may heterodyne or modulate the information in the output V 120 to a band of frequencies corresponding to the passband sub-channel.

In some embodiments, one or more of the N data streams in the vector X 210 may include real values or symbols. In other embodiments, one or more of the N data streams in the vector X 210 may include complex values or symbols that have an in-phase (I) component and an out-of-phase (Q) component. The Q component may be 90° out of phase with respect to the I component. In some embodiments, symbols in one or more of the N data streams in the vector X 210 may be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) or sixteen-level pulse amplitude modulation (16PAM). In embodiments where at least one of the N data streams corresponds to a passband sub-channel, i.e., a band of frequencies not including DC, on-off keying (OOK), may be used. Suitable coding corresponding to one or more passband sub-channels may also include quadrature amplitude modulation (QAM).

Note that the circuit 400 is simplified with respect to circuit 200 (FIG. 2). While there are M DACs 414 instead of one DAC 226 (FIG. 2), the number of bits of precision of the DACs has been reduced from 11 to 9. In addition, three stages of digital processing have been reduced to a single stage and the 8 to 1 multiplexer 224 has been replaced with four, 2 to 1 multiplexers 408. Circuit 200 (FIG. 2) and circuit 400 both utilize approximately the same total current.

Figure 5:
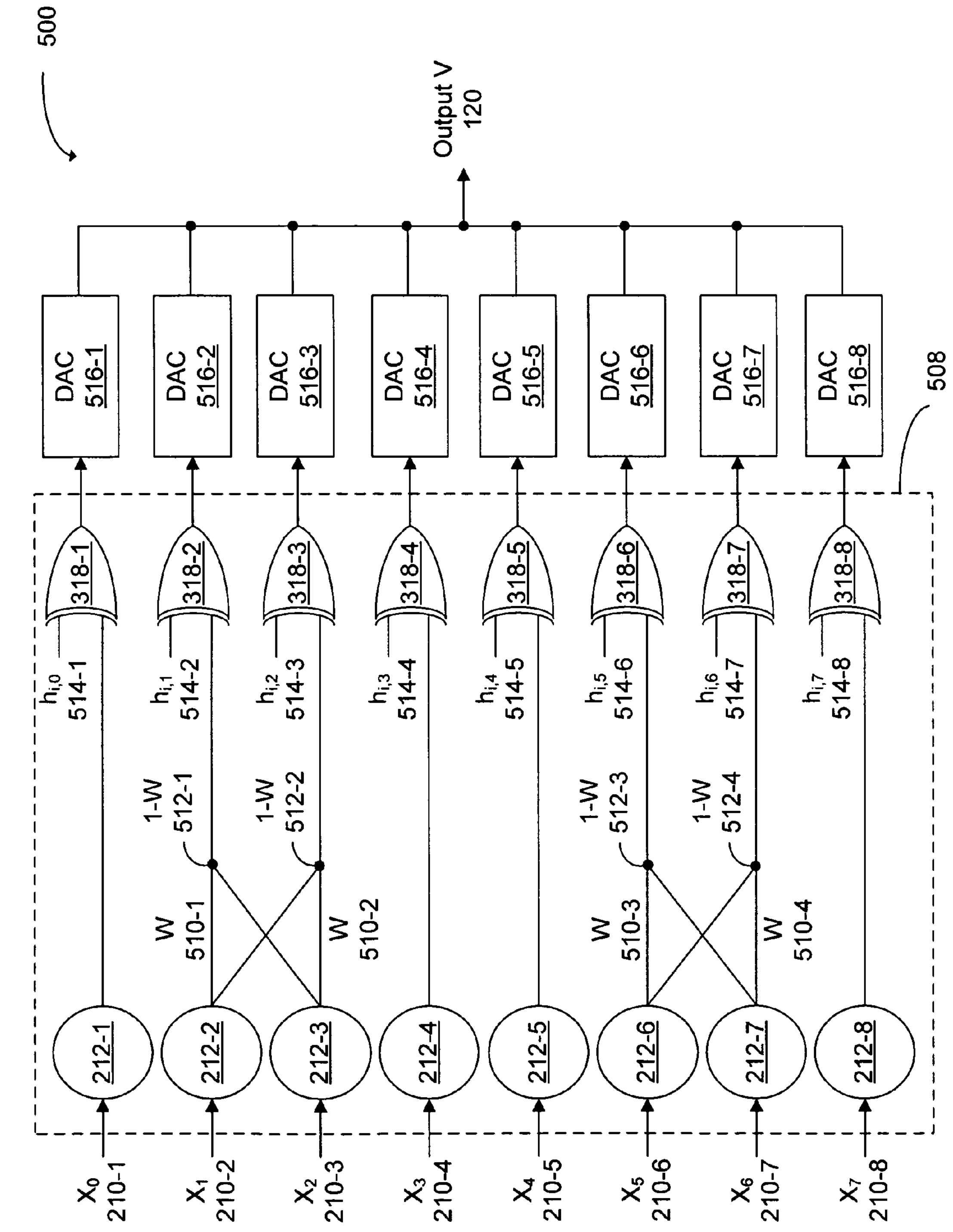
FIG. 5 is a block diagram illustrating an embodiment of a circuit.

FIG. 5 is a block diagram illustrating an embodiment of a circuit 500. The circuit 500 includes a portion in the digital domain 508 and a portion in the analog domain. The portion in the digital domain 508 implements at least a sub-block of an IDFT that drives an array of M DACs 516 (e.g., 8-bit DACs) in the analog domain.

Circuit 500 may have the vector X 210 as an input. The vector X 210 may include N data streams of bits or symbols. While N is illustrated as 8, N may be 4, 16, 32, 64, 128 or more bits or symbols. The vector X 210 may be stored in the registers 212. Appropriate register 212 contents are summed and/or weighted and summed using weights W 510 and 512 at the nodes, thereby implementing a linear transformation corresponding to a subset of the IDFT. Resulting outputs are coupled to M XOR gates 318. While M is illustrated as 8, in other embodiments M may be larger or smaller. In an exemplary embodiment, M is a value between 1 and N.

The M XOR gates 318 may implement sign changes of the outputs from the nodes and the registers 212 in accordance with the set of coefficients H 514. Outputs from the M DACs 516 may be current summed to generate the output V 120. Note that the circuit 500 does not include multiplexers and that the output V 120 has a data rate corresponding to the Nyquist rate of the N data streams in the vector X 210.

In some embodiments, the circuit 500 may include a finite state machine (FSM) and/or control logic. Alternatively, the control logic may be implemented outside of the circuit 500. The FSM and/or the control logic may provide control signals to one or more components in the digital domain 508. The control signals may configure, adjust and/or program one or more of these components. For example, in some embodiments the weights 510 and 512 may be implemented using a plurality of fixed gain drivers and/or a plurality of programmable drivers. The FSM and/or the control logic may adjust values of the programmable drivers and/or the set of coefficients H 514. In some embodiments, the control signals may be fixed over two or more time intervals corresponding to a bit or symbol period for at least one of the N data streams in the vector X 210.

In some embodiments, the circuit 500 may have fewer or more components. Functions of two or more components may be implemented in a single component. Alternatively, functions of some components may be implemented in additional instances of the components. For example, in some embodiments there may be more than one FSM, more than one control logic and/or one or more external interfaces. There may be one or more additional stages in the digital domain 508 and/or the analog domain. In some embodiments, signals from one or more FSMs may supplement and/or replace one or more clock signals. There may be more than one instance of the circuit 500. Each instance of the circuit 500 may be applied to a respective vector, such as the vector X 210.

In some embodiments, one or more instances of the circuit 500 may implement linear precoding or cyclic padding of one or more of the N data streams. One or more instances of the circuit 500 may apply a different weight to respective data streams. In an alternate embodiment, the circuit 500 may include multiple instances of the portion in the digital domain 508 coupled to the portion in the analog domain using a router or a multiplexer. In some embodiments, in order to modify a respective phase of the at least a subset of the digital data symbols or bits in one or more of the N data streams, the circuit 500 may include a rotation circuit, such as a one or more-tap equalizer. In some embodiments, the equalizer may be complex, i.e., adjusting a magnitude and a phase.

The N data streams may corresponding to one or more sub-channels in a multi-channel communications link. In embodiments where the N data streams correspond to a passband sub-channel, such as in a multi-tone link, additional components after the circuit 500 may modulate the output V 120. The modulation may heterodyne or modulate the information in the output V 120 to a band of frequencies corresponding to the passband sub-channel.

In some embodiments, one or more of the N data streams in the vector X 210 may include real values or symbols. In other embodiments, one or more of the N data streams in the vector X 210 may include complex values or symbols that an inphase (I) component and an out-of-phase (Q) component. The Q component may be 90° out of phase with respect to the I component. In some embodiments, symbols in one or more of the N data streams in the vector X 210 may be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) or sixteen-level pulse amplitude modulation (16PAM). In embodiments where at least one of the N data streams corresponds to a passband sub-channel, i.e., a band of frequencies not including DC, on-off keying (OOK), may be used. Suitable coding corresponding to one or more passband sub-channels may also include quadrature amplitude modulation (QAM).

Note that circuit 500 is simplified with respect to circuit 200 (FIG. 2). While there are 8 DACs 516 instead of one DAC 226 (FIG. 2), the number of bits of precision of the DACs has been reduced from 11 to 8. In addition, three stages of digital processing has been reduced to a single stage and the 8 to 1 multiplexer 224 has been eliminated.

Figure 6:
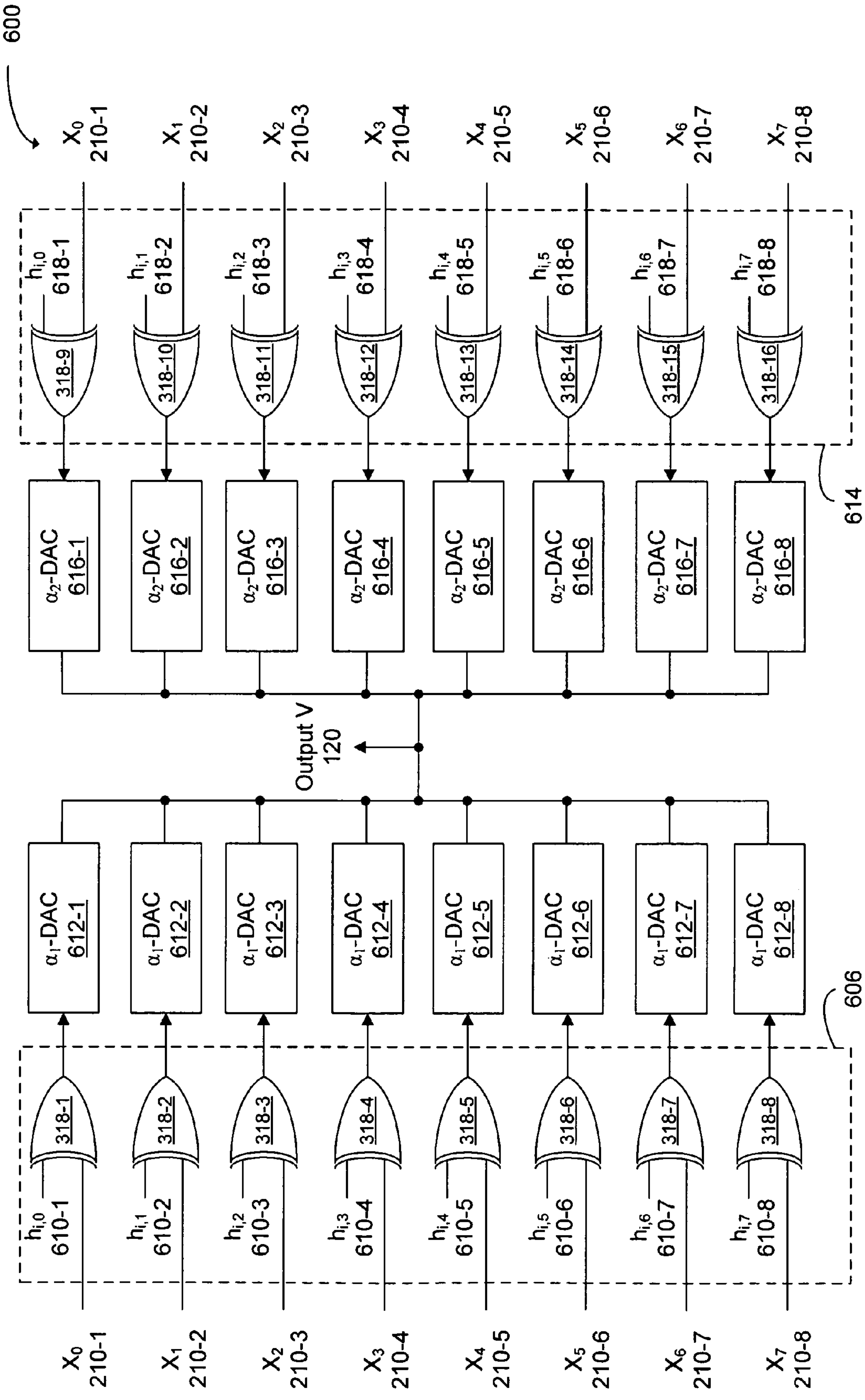
FIG. 6 is a block diagram illustrating an embodiment of a circuit.

FIG. 6 is a block diagram illustrating an embodiment of a circuit 600. The circuit 600 includes two portions 606 and 614 in the digital domain and a portion in the analog domain. The circuit portions 606 and 614 in the digital domain implement at least a sub-block of an IDFT that drive two arrays, respectively, of M 8-bit DACs 612 and 616 in the analog domain. The arrays of M DACs 612 and 616 have corresponding weights $\alpha_1$ and $\alpha_2$, respectively.

Each circuit portion 606 and 614 may have the vector X 210 as an input to at least the sub-block of the IDFT. The vector X 210 may include N data streams of bits or symbols. While N is illustrated as 8, N may be 16, 32, 64, 128 or more bits or symbols. The sign of the one or more of the N data streams in the vector X 210 may be changed using the M XOR gates 318 in the portions 606 and 614. While M is illustrated as 8, in other embodiments M may be larger or smaller. In an exemplary embodiment, M may be between 1 and N.

The M XOR gates 318 may implement sign changes of the N data streams in the vector X 210 in accordance with the set of coefficients H 610 and 618, respectively. Outputs from the M DACs 612 and 616 may be current summed to generate the output V 120. Note that the circuit 600 does not include the linear transformation corresponding to the matrix D or the multiplexers, and that the output V 120 has a data rate corresponding to the Nyquist rate of the N data streams in the vector X 210.

In some embodiments, the circuit 600 may include a finite state machine (FSM) and/or control logic. Alternatively, the control logic may be implemented outside of the circuit 600. The FSM and/or the control logic may provide control signals to one or more components in the portions 606 and 614. The control signals may configure, adjust and/or program one or more of these components. The FSM and/or the control logic may adjust values of the set of coefficients H 610 and 618. In some embodiments, the control signals may be fixed over two or more time intervals corresponding to a bit or symbol period for at least one of the N data streams in the vector X 210.

In some embodiments, the circuit 600 may have fewer or more components. Functions of two or more components may be implemented in a single component. Alternatively, functions of some components may be implemented in additional instances of the components. For example, in some embodiments there may be more than one FSM, more than one control logic or one and/or more external interfaces. There may be one or more additional stages in the portions 606 and 614 and/or the analog domain. In some embodiments, signals from one or more FSMs may supplement and/or replace one or more clock signals. There may be more than one instance of the circuit 600. Each instance of the circuit 600 may be applied to a respective vector, such as the vector X 210.

In some embodiments, one or more instances of the circuit 600 may implement linear precoding or cyclic padding of one or more of the N data streams. One or more instances of the circuit 600 may apply a different weight to respective data streams. In an alternate embodiment, the circuit 600 may include multiple instances of the portions 606 and/or 614 coupled to the portion in the analog domain using a router or a multiplexer. In some embodiments, in order to modify a respective phase of the at least a subset of the digital data symbols or bits in one or more of the N data streams, the circuit 600 may include a rotation circuit, such as a one or more-tap equalizer. In some embodiments, the equalizer may be complex, i.e., adjusting a magnitude and a phase.

The N data streams may corresponding to one or more sub-channels in a multi-channel communications link. In embodiments where the N data streams correspond to a passband sub-channel, such as in a multi-tone link, additional components after the circuit 600 may modulate the output V 120. The modulation may heterodyne or modulate the information in the output V 120 to a band of frequencies corresponding to the passband sub-channel.

In some embodiments, one or more of the N data streams in the vector X 210 may include real values or symbols. In other embodiments, one or more of the N data streams in the vector X 210 may include complex values or symbols that have an in-phase (I) component and an out-of-phase (Q) component. The Q component may be 90° out of phase with respect to the I component. In some embodiments, symbols in one or more of the N data streams in the vector X 210 may be multi-level symbols based on a bit-to-symbol modulation code. Suitable symbol coding may include two or more level pulse amplitude modulation (PAM), such as two-level pulse amplitude modulation (2PAM), four-level pulse amplitude modulation (4PAM), eight-level pulse amplitude modulation (8PAM) or sixteen-level pulse amplitude modulation (16PAM). In embodiments where at least one of the N data streams corresponds to a passband sub-channel, i.e., a band of frequencies not including DC, on-off keying (OOK), may be used. Suitable coding corresponding to one or more passband sub-channels may also include quadrature amplitude modulation (QAM).

Note that circuit 600 is simplified with respect to circuit 200 (FIG. 2). While there are two arrays of M DACs 612 and 616 instead of one DAC 226 (FIG. 2), the number of bits of precision of the DACs has been reduced from 11 to 8. In addition, three stages of digital processing and the 8 to 1 multiplexer 224 have been eliminated.

Figure 7:
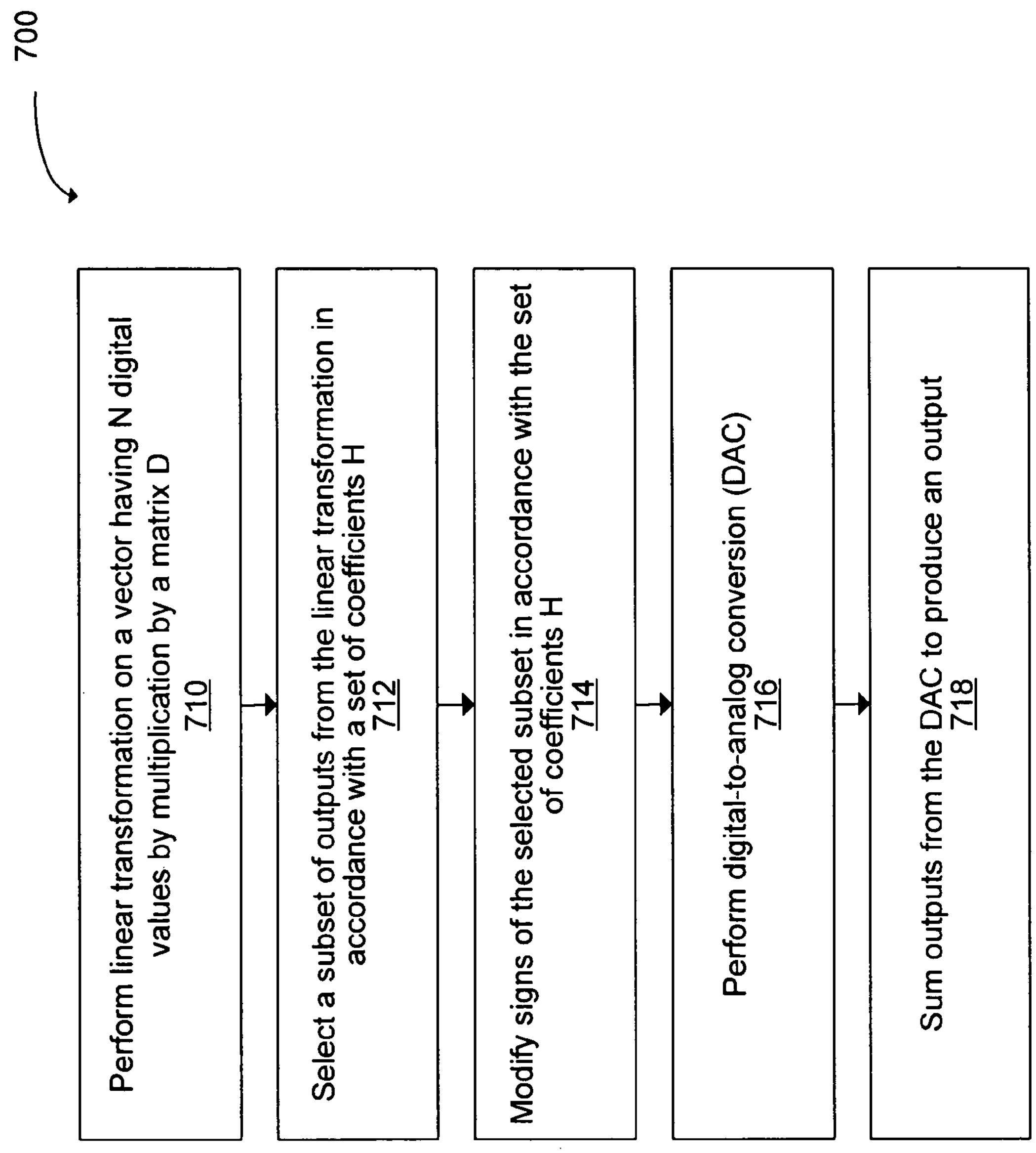
FIG. 7 is a flow diagram illustrating a method of operation of a circuit.

Attention is now directed towards processes for using circuits such as those described previously. FIG. 7 is a flow diagram illustrating a method of operation 700 of a circuit. A linear transformation may be performed on a vector having N digital values by multiplication by a matrix D (710). A subset of outputs from the linear transformation may be selected in accordance with a set of coefficients H (712). Signs of the selected subset may be modified in accordance with the set of coefficients H (714). Digital-to-analog conversion (DAC) may be performed (716). Outputs from the DAC may be summed to produce an output (718). In some embodiments, there may be fewer or additional operations, an order of the operations may be rearranged and/or two or more operations may be combined.

The one or more circuits may be applied in a variety applications, such as image processing as well as communications systems, such as multi-tone systems or links where sub-channels corresponding to bands of frequencies are used to convey information. A communications channel coupled to the one or more circuits may correspond to an interconnect or an interface, a bus and/or a back plane. The communications channel may correspond to inter-chip communication, such as between one or more semiconductor chips or dies, or to communication within a semiconductor chip, also known as intra-chip communication, such as between modules in an integrated circuit.

The circuits and related methods of operation are well-suited for use in improving communication in memory systems and devices. They are also well-suited for use in improving communication between a memory controller and one or more memory devices or modules, such as one or more dynamic random access memory (DRAM) devices (each of which is sometimes called a chip or integrated circuit). DRAM devices may be either on the same printed circuit board as the controller or embedded in a memory module. The apparatus and methods described herein may also be applied to other memory technologies, such as static random access memory (SRAM) and electrically erasable programmable read-only memory (EEPROM).

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, floppy disk media, hard disk media, CDs, DVDs, and so on.

Figure 8:
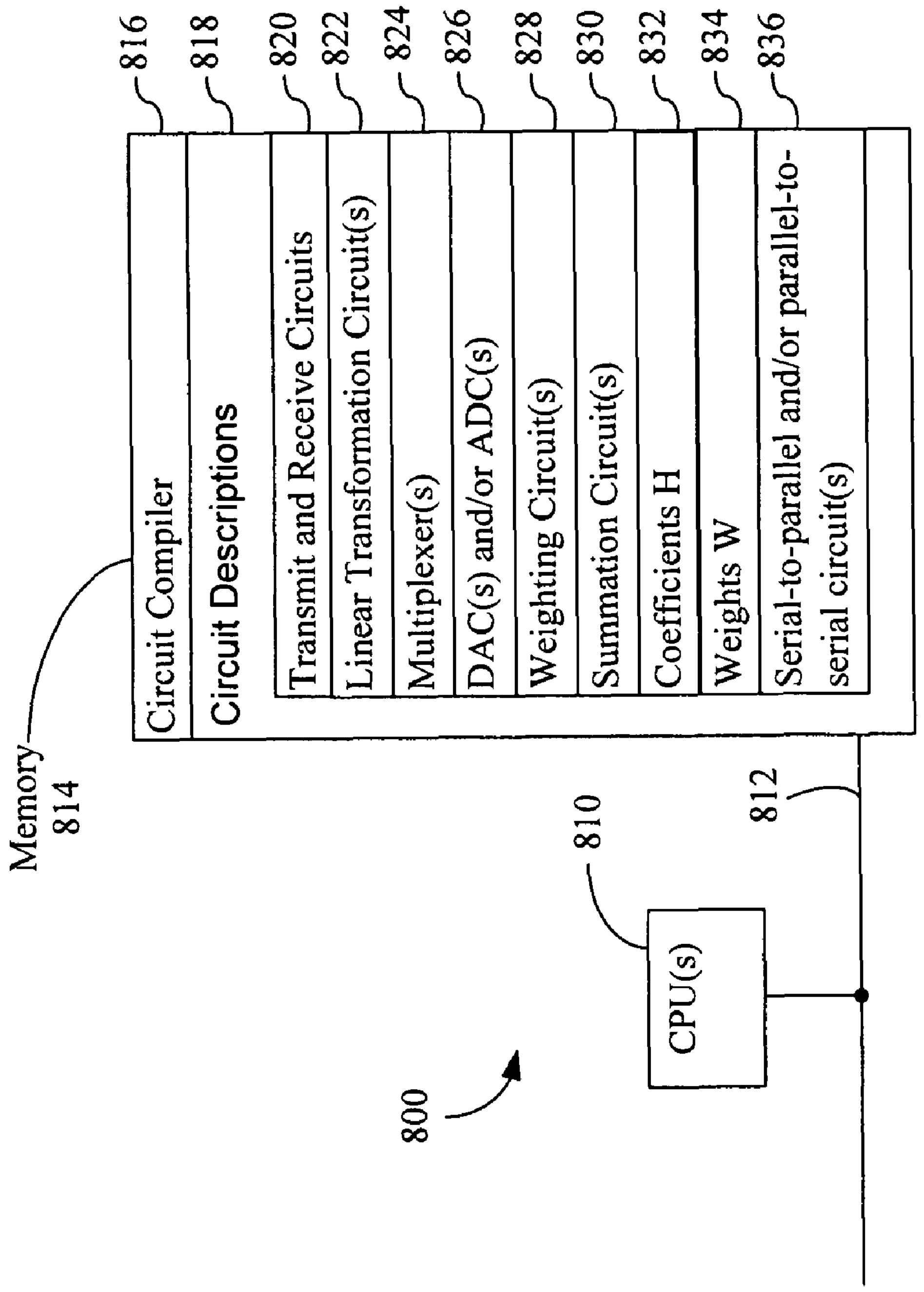
FIG. 8 is a block diagram illustrating an embodiment of a system.

FIG. 8 is a block diagram an embodiment of a system 800 for storing computer readable files containing software descriptions of the circuits. The system 800 may include at least one data processor or central processing unit (CPU) 810, a memory 814 and one or more signal lines 812 for coupling these components to one another. The one or more signal lines 812 may constitute one or more communications busses.

The memory 814 may include high-speed random access memory and/or non-volatile memory, such as one or more magnetic disk storage devices. The memory 814 may store a circuit compiler 816 and circuit descriptions 818. The circuit descriptions 818 may include transmit and receive circuits 820, linear transformation circuits 822, multiplexers 824, DACs and/or ADCs 826, weighting circuits 828, summation circuits 830, coefficients H 832 and/or weights W 834. The circuit descriptions 818 may include descriptions of additional circuits, and in some embodiments may include only a subset of the circuit descriptions shown in FIG. 8. For instance, some embodiments may include phase rotation circuits (not shown), serial-to-parallel and/or parallel-to-serial circuits 836.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A device, comprising:

a linear transformation circuit to implement multiplication by a matrix D, the linear transformation circuit having an input to receive a vector having N digital values and an output to output N first output signals;

a sign-adjustment circuit to adjust signs of a subset including at least M of the N first output signals in accordance with a set of coefficients H; and a digital-to-analog-conversion (DAC) circuit coupled to the sign-adjustment circuit, wherein outputs from the DAC circuit are summed to produce an output.

2. The device of claim 1, further comprising an output-selection circuit to select the subset of the N first output signals in accordance with the set of coefficients H.

3. The device of claim 1, wherein the matrix D and the set of coefficients H correspond to a decomposition of an inverse discrete Fourier transform (IDFT), wherein the output corresponds to the IDFT of the vector.

4. The device of claim 3, wherein the linear transformation circuit implements several instances of the linear transformation sequentially, and wherein each instance of the linear transformation has a radix of M.

5. The device of claim 3, wherein the linear transformation circuit implements several instances of the linear transformation in parallel, and wherein each instance of the linear transformation has a radix of M.

6. The device of claim 1, wherein N analog output values in the output are generated sequentially.

7. The device of claim 1, wherein summation of the outputs from the DAC circuit occurs at a current summation node.

8. The device of claim 1, wherein the N digital values correspond to real and imaginary portions of a block of N complex values having complex conjugate symmetry.

9. The device of claim 1, wherein the N digital values correspond to real and imaginary portions of a block of N/2 complex values.

10. The device of claim 1, wherein the N digital values correspond to a block of N real values.

11. The device of claim 1, wherein the DAC circuit includes M DACs.

12. The device of claim 1, wherein M is between 1 and N.

13. The device of claim 1, wherein the sign-adjustment circuit includes M XOR gates.

14. The device of claim 1, wherein the set of coefficients H includes 0, 1 and -1.

15. The device of claim 1, wherein the N first output signals equal the N digital values.

16. The device of claim 15, wherein M equals N.

17. The device of claim 1, wherein the DAC circuit includes a plurality of DACs and wherein each of the DACs includes an analog weight $\alpha$.

18. A device, comprising:

a linear transformation circuit to implement multiplication by a matrix D, the linear transformation circuit having an input to receive a vector having N digital values and an output to output N first output signals; and an output circuit coupled to the linear transformation circuit, wherein the output circuit implements digital-to-analog-conversion (DAC) on a subset including at least M of the N first output signals in accordance with a set of coefficients H and adjusts signs of the subset in accordance with the set of coefficients H, and wherein outputs from the output circuit are summed to produce an output.

19. A method, comprising:

performing a linear transformation on a vector having N digital values, wherein the linear transformation corresponds to multiplication by a matrix D;

selecting a subset of outputs from the linear transformation in accordance with a set of coefficients H;

modifying signs of the selected subset in accordance with the set of coefficients H;

performing digital-to-analog conversion (DAC) on outputs from the modifying; and summing outputs from the DAC to produce an output.

20. A device, comprising:

a first means for implementing multiplication by a matrix D, the first means having an input to receive a vector having N digital values and an output to output N first output signals;

a second means for selecting a subset of the N first output signals in accordance with a set of coefficients H;

a third means for adjusting signs of the selected first output signals in accordance with the set of coefficients H; and a digital-to-analog-conversion (DAC) circuit coupled to the third means, wherein outputs from the DAC circuit are summed to produce an output.

21. A computer readable medium containing data representing a circuit that includes:

a device, comprising:

a linear transformation circuit to implement multiplication by a matrix D, the linear transformation circuit having an input to receive a vector having N digital values and an output to output N first output signals;

an output-selection circuit to select a subset of the N first output signals in accordance with a set of coefficients H;

a sign-adjustment circuit to adjust signs of the selected first output signals in accordance with the set of coefficients H; and a digital-to-analog-conversion (DAC) circuit coupled to the sign-adjustment circuit, wherein outputs from the DAC circuit are summed to produce an output.

* * * * *